United States Patent [19]

Riel

[11] 4,242,176
[45] Dec. 30, 1980

[54] METHOD OF FOAMING PERFORATE SHEET MATERIAL FROM WIRE MESH

[75] Inventor: Frank J. Riel, San Diego, Calif.

[73] Assignee: Rohr Industries, Inc., Chula Vista, Calif.

[21] Appl. No.: 30,254

[22] Filed: Apr. 16, 1979

Related U.S. Application Data

[63] Continuation of Ser. No. 908,810, May 24, 1978, abandoned.

[51] Int. Cl.$^3$ .................. B44C 1/22; C03C 15/00; C03C 25/06; C23F 1/00
[52] U.S. Cl. .................... 156/630; 156/639; 156/644; 156/651; 156/664; 428/613
[58] Field of Search ............ 428/256, 613, 549, 941, 428/550, 567, 608; 252/79.2, 79.3; 156/644, 650, 651, 656, 639, 630, 634, 664; 29/428; 427/309; 139/425 R; 140/5-9, 17, 111, 112

[56] References Cited

U.S. PATENT DOCUMENTS

| | | | |
|---|---|---|---|
| 2,047,369 | 7/1936 | Hickok | 427/309 X |
| 2,925,650 | 2/1960 | Pall | 428/613 X |
| 3,056,432 | 10/1962 | Glaze | 428/608 X |
| 3,388,448 | 6/1968 | Lovett | 428/613 X |

Primary Examiner—William A. Powell
Attorney, Agent, or Firm—Patrick J. Schlesinger; Frank D. Gilliam

[57] ABSTRACT

A method of manufacturing a perforate material from wire mesh for honeycomb noise attenuation and the resulting material therefrom comprising the steps of selecting a sheet of wire mesh, constructed from a material that can be readily diffusion bonded; cleaning the selected wire mesh to remove all grease therefrom, suspending the sheet of selected wire mesh within a furnace, evacuating the oven to about $10.^5$ torr, elevating and maintaining the furnace temperature to facilitate diffusion bonding of the contacting cross-over areas of the strands of the wire mesh; reducing the furnace temperature, removing the sheet of diffused wire mesh from the oven when its temperature is below its oxidation level. The furnace may additionally be charged with an inert gas to decrease the cooling time. In some instances a heat dispersing member is inserted between the sheet of wire mesh and the source of the elevating temperature. The mesh is selected with hole sizes equal or slightly less in cross-section than the desired diffused size. Where the hole cross-section size is slightly less than ultimately required the hole size is enlarged by conventional chem-milling of the diffused wire mesh.

4 Claims, 4 Drawing Figures

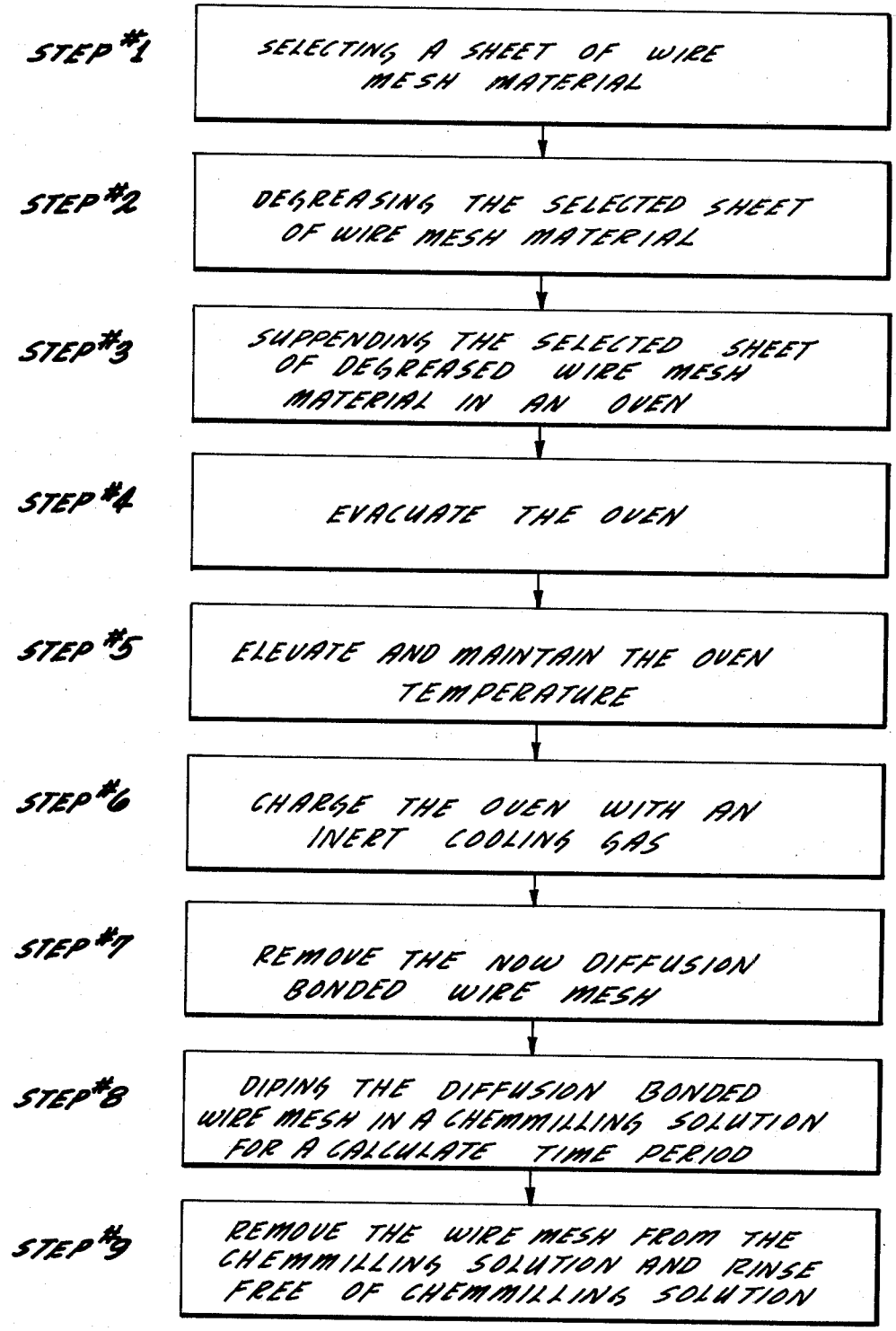

METHOD OF FOAMING PERFORATE SHEET MATERIAL FROM WIRE MESH

This is a continuation of application Ser. No. 908,810 filed May 24, 1978 now abandoned.

BACKGROUND OF THE INVENTION

This invention relates to perforate metal sheets and to the method of producing the same.

Present day problems of control of boundary layers in high velocity gas flow, temperature control of normally severely heated parts and the like are being met increasingly by the use of porous fused metal particle layers, as described in U.S. Pat. No. 2,554,343. In general, considerable difficulty has been encountered in providing such products to meet the critical factors of close control of uniformity in the size and shape of the pores and in tensile strength of the material.

It has been suggested that perforate sheet material having a myriad of uniformly and precisely dimensioned pores formed therein be employed. The preparation of these materials has met with difficulties.

One method of preparing such material is to drill holes in a metallic sheet in the required pattern and size. This is expensive and quite difficult to do as the pores must be set at close centers and there is a physical limit to how small the pores can be drilled.

Other methods involve fusing together the cross-over points of the mesh and then rolling the diffused mesh into a flat sheet wherein the pores cross-section size is reduced, and the material weakened. This process requires the use of heavy and expensive equipment for the rolling, especially for the wide sheets of material required for noise attenuation applications.

SUMMARY OF THE INVENTION

In accordance with the present invention the product resulting from the instant method is produced with greater pore cross-sectional uniformity and the varying thickness of the mesh sheet does not affect the pore size when the material is chemically etched for the purpose of increasing pore cross-section size after the diffusion bonding process.

The only limitation to the size of the wire mesh is the physical size of the furnace and chemical milling tanks, whereas the rolling of wide sheets necessitates very expensive and precise equipment.

An important parameter of the instant product is its non linearity factor when utilized for controlling band noise attenuation, this feature is not changed by etching but is adversely affected by the rolling process.

The etching process can be carried out by a gradual immersion into the chemical milling solution or a gradual withdrawal rate or both to provide a graded flow resistance from one edge of the material to the other. These graduations offer improved noise attenuation advantages for some acoustic applications.

The etching process is rapid, controllable and the equipment utilized is relatively simple and inexpensive, thereby producing a low cost end product.

The product and methods in accordance with the present invention are described in detail below.

BRIEF DESCRIPTION OF THE DRAWINGS

FIG. 4 a flow diagram of the steps of the method of the instant invention.

The present invention relates to a method of forming perforate metal sheets from suitable wire mesh material and the perforate metal sheets made from the method. More particularly, the invention relates to a method of forming perforate metal sheet material from interwoven metallic filaments by first diffusion bonding the metallic filaments at their cross-over contact points and then chemically milling the resulting diffusion bonded metal sheet material to enlarge the cross-sectional area of the opening through the material for decreasing their flow resistance.

To these ends, the present invention contemplates the use of wire mesh with metallic filaments interwoven in any weave style having crossover filaments, with the relative positions of the filaments in the weave being initially stabilized by the characteristics of the weave itself.

Figure 1:
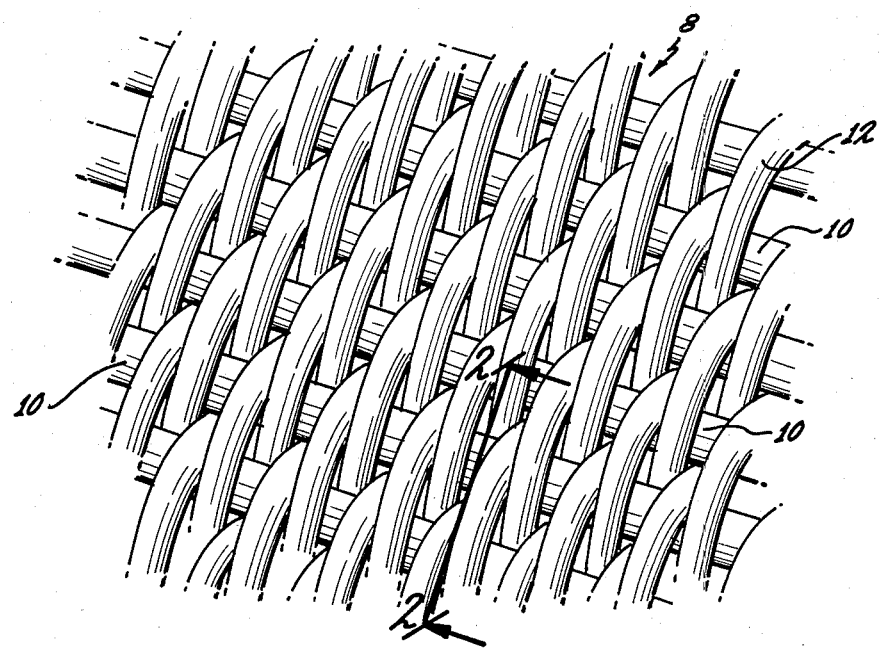
FIG. 1 is an enlarged plan view of a section of a typical example of woven stainless steel cloth utilized in the invention.

For the purpose of ease of explanation, 200×900 Twilled Dutch Weave 8, as shown in FIG. 1, has been chosen for the purpose of teaching the invention. This specific material should not be considered a limitation as any type woven material having warp and weft strands that are contacting at their cross-overs may be utilized equally as well to practice the instant invention.

The weft 10 is positioned transverse to the warp 12 and there are twice the number of weft strands as warp strands in this particular weave pattern. The showing of FIG. 1 is approximately 200 times actual size.

Figure 2:
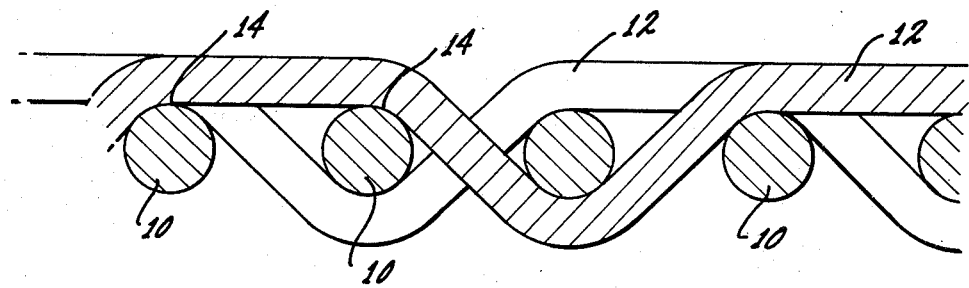
FIG. 2 is an enlarged cutaway section taken along line 2—2 of FIG. 1 showing the warp and weft filament prior to diffusion bonding.

Referring now to FIG. 2, this figure is a section taken along line 2—2 of FIG. 1 and is approximately 400 times the actual size of the woven material. The strands of warp and weft are shown having physical contact at 14, which is the natural condition of this weave pattern.

Figure 3:
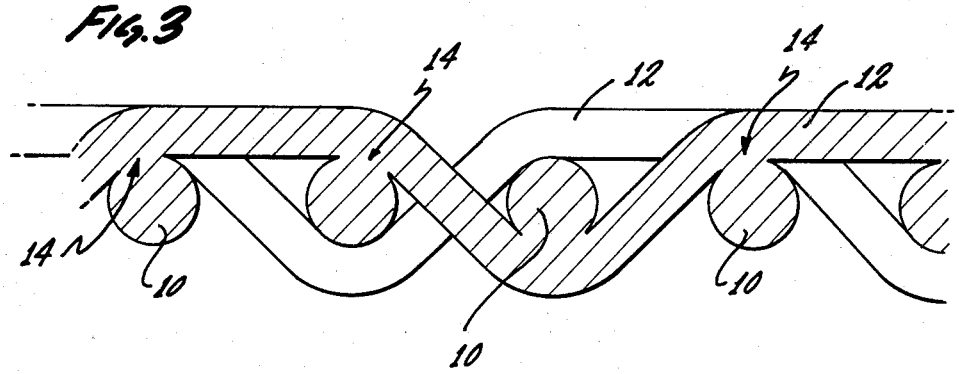
FIG. 3 is an enlarged cutaway section of FIG. 1 taken along line 2—2 of FIG. 1 showing the warp filament adhering by diffusion bonding to the weft filaments.

A piece of wire mesh material is selected having a suitable size for handling during the process, as hereinafter described. In order to acheive diffusion bonding the selected piece of material is cleaned and degreased by any suitable cleaner designed for this purpose. The now degreased material is draped or hung in a protective atmosphere in a suitable furnace for heating. Depending on the type of material from which the wire mesh material is constructed, a heat dispensing shield made of suitable material may be positioned between the mesh and the heat source. At the start of the diffusion bonding heat cycle a hard vacuum (in the order of $10.^5$ torr) is employed within the selected heating furnace. The internal temperature of the furnace is then elevated to a temperature in the range of 2000 to 2200° F. and held at that elevated temperature for a sufficient length of time to cause diffusion bonding at the strand contact areas 14, as shown in FIG. 3. It has been found that the length of time required at the elevated temperature is in the order of one hour.

The temperature of the evacuated furnace is then allowed to cool to room temperature or for faster cooling the furnace can be charged with an inert gas, such as but not limited to argon or the like, when the furnace temperature has reduced in the area of 350° F.

The now diffusion bonded piece of wire mesh material is removed from the furnace. In some applications it is ready for its ultimate use. This would be for those applications where the desired flow resistance was approximately equal to the flow resistance of the original weave.

In many other applications because of the limited range of weave styles having the desired flow resistance level, plus a desire to be able to provide a different flow resistance level, in the range of 15–50 Rayls, diffused mesh having a high flow resistance is treated by a chemical milling process to etch away strand material reducing their physical cross-section to decrease its flow resistance.

Commonly available solutions for chemical milling may be utilized. Typically chemical milling solutions are $HCl/HNO_3/FeCl_3$ and $HF/HNO_3$. When different flow resistance levels are desired in a single sheet of diffused material having uniform openings, the material may have portions of its surface area immersed into the chemical milling solution for different lengths of time, thus resulting in different mesh opening and hence different flow resistance, the flow rate resistance decreasing with time when the mesh is in the chemical milling solution.

The chemical milled diffused wire mesh is then dipped into a neutralizer solution, such as water, to fix the etching process.

The invention provides a method for producing a controlled flow resistance diffusion bonded structure which can be manufactured at less cost and in less time than has hereto been possible.

This invention may be embodied in other forms or carried out in other ways without departing from the spirit or essential characteristics thereof. The present embodiments and examples of invention are therefore to be considered as in all respects illustrative and not restrictive, the scope of the invention being indicated by the appended claims, and all changes which come within the meaning and range of equivalency of the claims are intended to be embraced herein.

Having thus described the invention, what is claimed as new and useful and desired to be secured by United States Letter Patent is:

1. Method of manufacture of porous material for utilizing as a face sheet attenuation structure comprising:
    selecting a sheet of stainless steel wire mesh material with overlapping perpendicular fibers defining the openings therethrough;
    degreasing said sheet of wire mesh material;
    suspending said sheet of wire mesh material within an oven;
    elevating the temperature of said oven and maintaining said oven at said elevated temperature for a sufficient length of time to diffusion bond overlapping portions of said fibers;
    allowing said oven to return to room temperature;
    removing said wire mesh material from said oven; and
    chem-milling said wire mesh material to increase the cross-sectional size of said openings by reduction of the cross-sectional size of said perpendicular fibers.

2. The method of claim 1, including the additional step of charging said oven with an inert gas at a decreased oven temperature to hasten internal oven temperature reduction.

3. The method as defined in claim 1 additionally comprising the step of positioning a heat dispersing member between said wire mesh and the source of said elevating temperature.

4. The method as defined in claim 1, wherein the chem-milling step includes subjecting portions of the wire mesh material to the chem-milling solution for various different lengths of time, thereby providing various different flow resistance levels through the pores of said porous material.

* * * * *

UNITED STATES PATENT OFFICE
CERTIFICATE OF CORRECTION

Patent No. 4,242,176      Dated December 30, 1980

Inventor(s) Frank J. Riel

It is certified that error appears in the above-identified patent and that said Letters Patent are hereby corrected as shown below:

[54] "Foaming" should be --Forming--.

Column 1, line 1, "Foaming" should be --Forming--.

Signed and Sealed this

Twelfth Day of May 1981

[SEAL]

Attest:

RENE D. TEGTMEYER

*Attesting Officer*      *Acting Commissioner of Patents and Trademarks*